US009588750B2

United States Patent
Hoy et al.

(10) Patent No.: US 9,588,750 B2
(45) Date of Patent: Mar. 7, 2017

(54) PSEUDO PROGRAM USE DURING PROGRAM INSTALLATION

(71) Applicant: International Business Machines Corporation, Armonk, NY (US)

(72) Inventors: Jeffrey R. Hoy, Southern Pines, NC (US); Barry J. Pellas, Durham, NC (US); Matthew T. Pellas, Raleigh, NC (US); David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/849,122

(22) Filed: Mar. 22, 2013

(65) Prior Publication Data

US 2014/0289723 A1    Sep. 25, 2014

(51) Int. Cl.
*G06F 9/445*    (2006.01)

(52) U.S. Cl.
CPC ..................... *G06F 8/61* (2013.01)

(58) Field of Classification Search
USPC .......................................................... 717/174
See application file for complete search history.

(56) References Cited

U.S. PATENT DOCUMENTS

| | | | |
|---|---|---|---|
| 6,633,899 B1 | 10/2003 | Coward | |
| 8,151,273 B2 | 4/2012 | Spence et al. | |
| 2004/0015965 A1 | 1/2004 | Sparks | |
| 2004/0267911 A1* | 12/2004 | Alam | G06F 8/60 709/220 |
| 2004/0268345 A1* | 12/2004 | Lodwick | G06F 8/63 717/176 |
| 2005/0055644 A1* | 3/2005 | Stockton | G06F 17/30905 715/766 |
| 2005/0193269 A1* | 9/2005 | Haswell | G06F 11/3684 714/38.13 |
| 2006/0277469 A1 | 12/2006 | Chaudhri et al. | |
| 2008/0172306 A1* | 7/2008 | Schorr | G06Q 30/02 705/26.41 |
| 2008/0250405 A1* | 10/2008 | Farhangi et al. | 717/177 |
| 2009/0007097 A1* | 1/2009 | Hinton et al. | 717/176 |
| 2009/0133013 A1* | 5/2009 | Criddle | G06F 8/60 717/174 |
| 2009/0183145 A1* | 7/2009 | Hu et al. | 717/168 |
| 2011/0016461 A1* | 1/2011 | Bankston et al. | 717/170 |
| 2011/0035740 A1* | 2/2011 | Powell et al. | 717/170 |

(Continued)

OTHER PUBLICATIONS

Pash, "Friday Fun: Play pinball while installing XP", http://lifehacker.com/192211/friday-fun-play-pinball-while-installing-xp, Published Aug. 4, 2006.*

(Continued)

*Primary Examiner* — Chameli Das
*Assistant Examiner* — Joanne Macasiano
(74) *Attorney, Agent, or Firm* — Joseph W. Cruz

(57) ABSTRACT

A method, computer-readable storage medium, and computer system are provided. In an embodiment, install a first program product with an installation manager. Run a pseudo first program product while the first program product is installing. Perform functions of the first program product with the pseudo first program product while the first program product is installing.

14 Claims, 5 Drawing Sheets

(56) References Cited

U.S. PATENT DOCUMENTS

| | | | |
|---|---|---|---|
| 2011/0154317 A1* | 6/2011 | Madduri | G06F 8/61 717/174 |
| 2011/0246981 A1 | 10/2011 | Braun et al. | |
| 2012/0278439 A1* | 11/2012 | Ahiska et al. | 709/218 |
| 2013/0067456 A1* | 3/2013 | Khilnani | G06Q 10/067 717/174 |

OTHER PUBLICATIONS

Oracle, "Database Client Installation Guide", https://docs.oracle.com/cd/E11882_01/install.112/e24322/inst_task.htm#LACLI1324, Section 3.3.2, Archived Feb. 11, 2012.*
Hoy et al., "Parallel Program Installation and Configuration", Filed: Mar. 22, 2013.

* cited by examiner

PSEUDO PROGRAM USE DURING PROGRAM INSTALLATION

FIELD

The present invention generally relates to computer systems, and more specifically running a pseudo program of a program being installed.

BACKGROUND

Computer systems typically include a combination of computer programs and hardware, such as semiconductors, transistors, chips, circuit boards, storage devices, and processors. The computer programs are stored in the storage devices and are executed by the processors. Storing a computer program on the storage device and making it available to use may require an installation process.

SUMMARY

A method, computer-readable storage medium, and computer system are provided. In an embodiment, install a first program product with an installation manager. Run a pseudo first program product while the first program product is installing. Perform functions of the first program product with the pseudo first program product while the first program product is installing.

DETAILED DESCRIPTION

Figure 1:
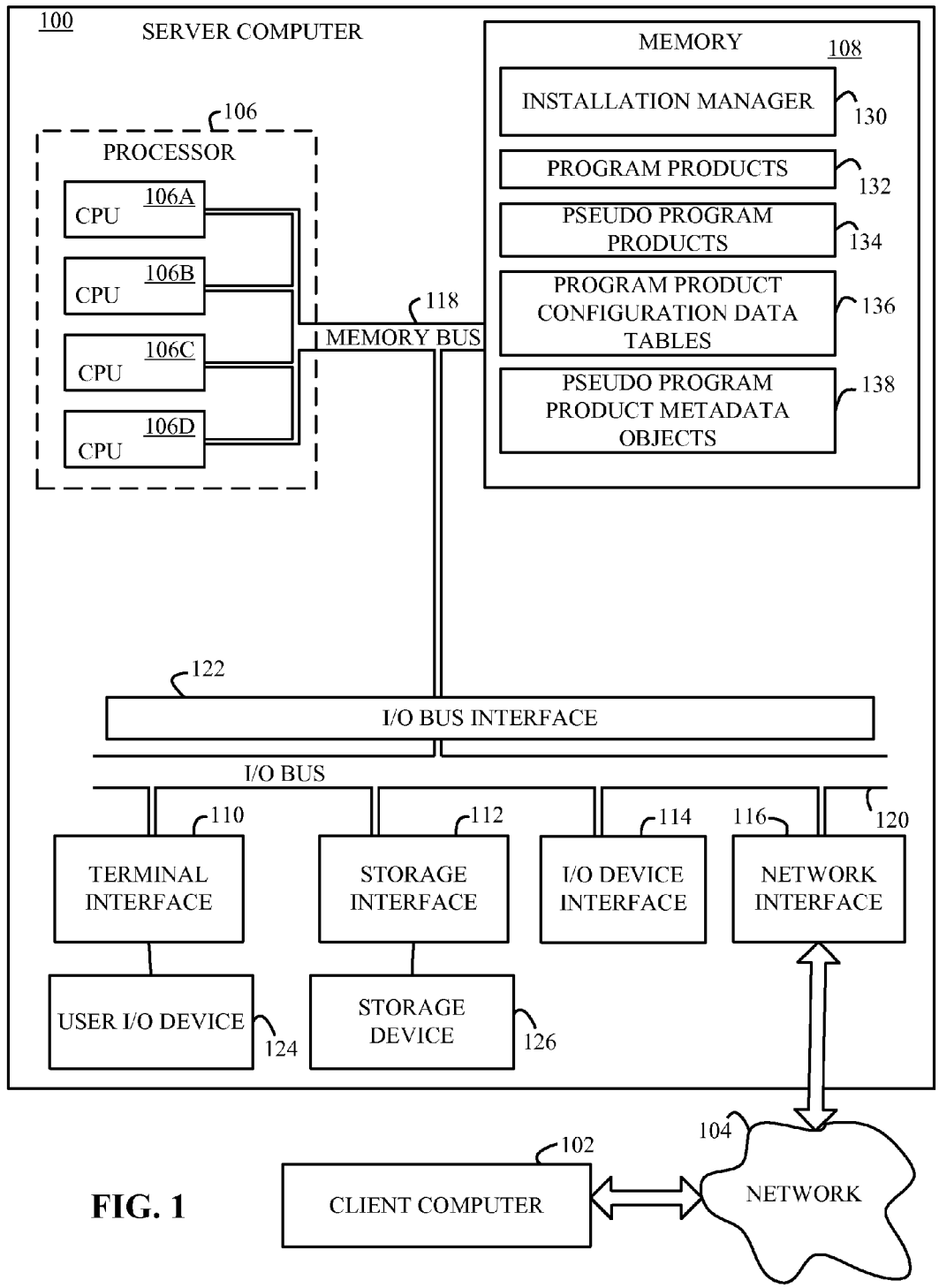
FIG. 1 depicts a high-level block diagram of an exemplary computer system for implementing an embodiment.

Installation and configuration of computer program products on computer systems may take considerable amounts of time to complete. In some instances, program product installation and configuration may take several hours to complete. During this time the user may be idling waiting for the program product to be installed.

For example, in one instance, current program product installations require the user to wait until all installation and configuration processes are complete before doing any work with the actual program product. This is true even though most program products could allow the user to do some of the actions ahead of time. Embodiments, herein, may be directed toward allowing certain capabilities of the program product to be available to the user while the program product or other program products are being installed. In one embodiment, a pseudo product program may be used while the full version of the program product is being installed. This may allow the user to complete initial tasks or create data objects that may be imported into the full version program product once installation is complete.

In another instance, program product installations do not allow the user to configure the program product while the program product installation is taking place. The known solutions of configuration include doing the configuration upfront before installation or doing the configuration work post-install. This is limiting because many times product installations may go on for hours and there may be no reason the user cannot make progress for the entire deployment while installation steps are proceeding. Embodiments, herein, allow for program product configuration as the program product reaches one or more installation milestones.

In another instance, other program products, that rely on the installation of a program product that is installing, may not begin installing until the installing program product has finished its installation. In one embodiment, parallel program product installation is described. The described embodiments may allow for installation of a second program product dependant on the installation of a first program product to be installed in parallel once the portion of the first program product the second program product relies on has been installed.

In another embodiment, the parallel program product installations may monitor each other such that if one program product creates a data object that may be used by the other parallel program product in its installation, then the program product creating a common data object may import the common data object to the program product still requiring the common data object. For example, the second program product installation may create a data object that has not been installed yet on the first program product. The second program product may import the data object to the first program installation. The importation may change the course, speed up, and lift road blocks or any combination thereof of the first program product installation.

Referring to the drawings, FIG. 1 depicts a high-level block diagram representation of a server computer system 100 connected to a client computer system 102 via a network 104, according to an embodiment. The terms "server" and "client" are used herein for convenience only, and in various embodiments a computer system that operates as a client computer in one environment may operate as a server computer in another environment, and vice versa. The mechanisms and apparatus of embodiments apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a network interface 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices.

The main memory 108 may store or encode an installation manager 130, program products 132, pseudo program products 134, program product configuration tables 136, and pseudo program product metadata objects 138. Although the installation manager 130, program products 132, pseudo program products 134, program product configuration tables 136, and pseudo program product metadata objects 138 are illustrated as being contained within the memory 108 in the computer system 100, in other embodiments some or all of them may be on different computer systems and may be accessed remotely, e.g., via the network 104. The computer system 100 may use virtual addressing mechanisms that allow the programs of the computer system 100 to behave as if they only have access to a large, single storage entity instead of access to multiple, smaller storage entities. Thus, while the installation manager 130, program products 132, pseudo program products 134, program product configuration tables 136, and pseudo program product metadata objects 138 are illustrated as being contained within the main memory 108, these elements are not necessarily completely contained in the same storage device at the same time. Further, although the installation manager 130, program products 132, pseudo program products 134, program product configuration tables 136, and pseudo program product metadata objects 138 are illustrated as being separate entities, in other embodiments some of them, portions of some of them, or all of them may be packaged together.

In an embodiment, the installation manager 130, program products 132, pseudo program products 134, program product configuration tables 136, and pseudo program product metadata objects 138 may include instructions or statements that execute on the processor 106 or instructions or statements that may be interpreted by instructions or statements that execute on the processor 106, to carry out the functions as further described below with reference to FIGS. 2, 3, 4, and 5. In another embodiment, the installation manager 130, program products 132, pseudo program products 134, program product configuration tables 136, and pseudo program product metadata objects 138, or two or more of these elements may be implemented in hardware via semiconductor devices, chips, logical gates, circuits, circuit cards, other physical hardware devices, or a combination of these devices in lieu of, or in addition to, a processor-based system. In an embodiment, the installation manager 130, program products 132, pseudo program products 134, program product configuration tables 136, and pseudo program product metadata objects 138, or two or more of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The network interface 116 may provide one or more communications paths from the computer system 100 to other digital devices and computer systems 102; such paths may include, e.g., one or more networks 104.

In various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The computer system 102 may include some or all of the hardware and/or computer program elements of the computer system 100. The various program components implementing various embodiments may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100. When the computer programs are read and executed by one or more processors in the computer system 100, or when interpreted by instructions that are executed by one or more processors, the computer programs cause the computer system 100 to perform the actions necessary to execute steps or elements including the various aspects of embodiments. Aspects of embodiments may be embodied as a system, method, or computer program product. Accordingly, aspects of embodiments may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (a non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in specific embodiments. But, any particular program nomenclature used herein is used merely for convenience, and thus embodiments are not limited to use solely in any specific application identified and/or implied by such nomenclature. The exemplary environments illustrated in FIG. 1 are not intended to limit embodiments. Indeed, other alternative hardware and/ or program environments may be used without departing from the scope of embodiments.

Figure 2:
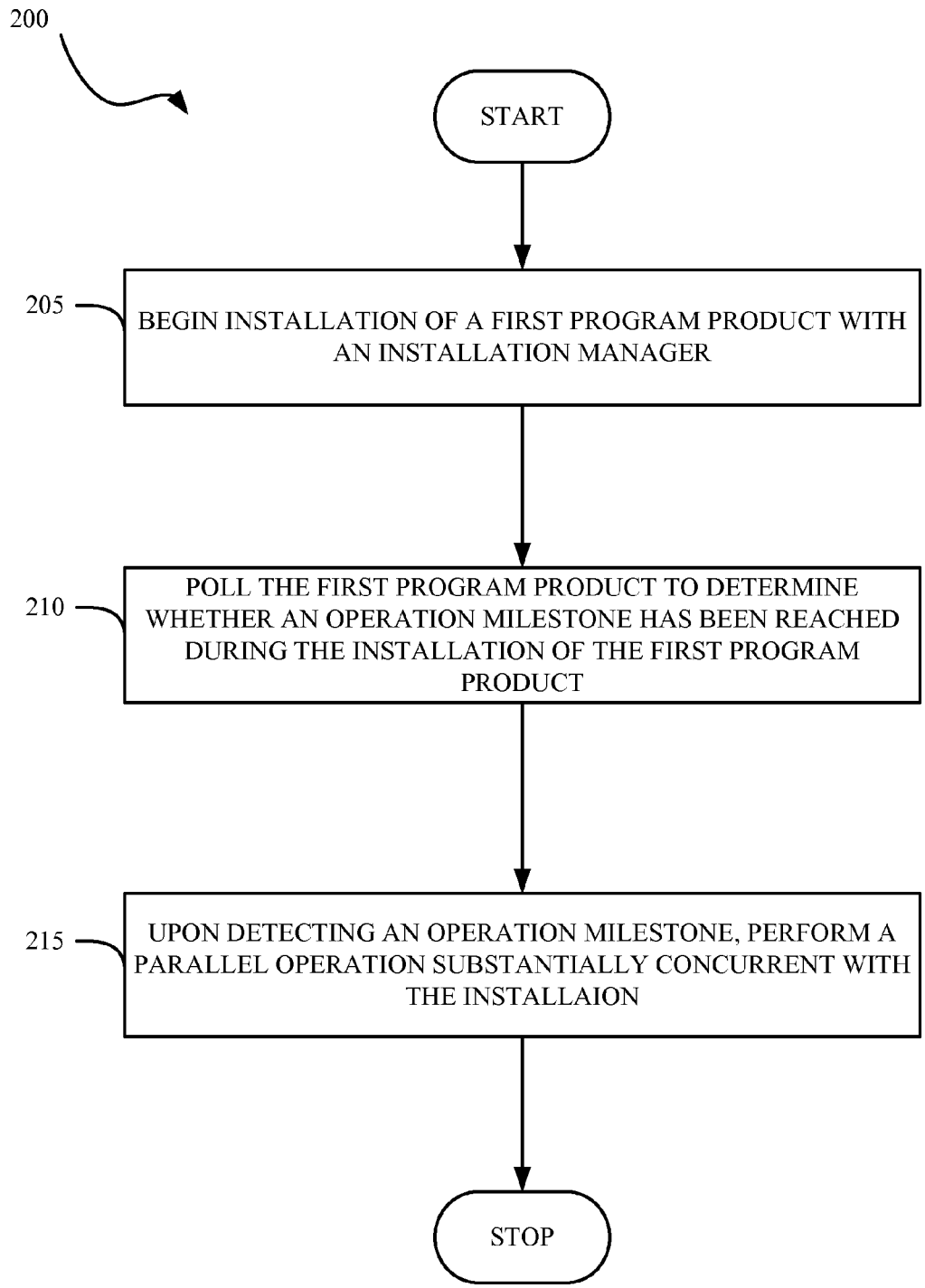
FIG. 2 depicts a flowchart of a high-level method of installing and configuring program products in parallel, according to an embodiment

Referring to FIG. 2, a flowchart is illustrated of a high-level method 200 of parallel configuration and installation, according to an embodiment. In operation 205, a first program may begin installation on the computer system 100. The installation may be managed by an installation manager 130. In operation 210, the first program product may be polled to determine whether an operation milestone has been reached in the first program product installation. The operation milestone may be a configuration milestone or an installation milestone, for example. Generally, a configuration milestone may be a point during the program product installation when data may be collected to configure the program product being installed. For example, a component of a program product that accepts configuration data may be installed. An installation milestone may generally be a point during the program product installation when an additional program product may begin installing. For example, a component database of the first program product may be installed that a second program product relies on before it can begin installation. The configuration milestone and the installation milestone are explained in more detail further below. The polling may be completed by, but not limited to, the installation manager 130 or a second program product.

In operation 215, upon detecting an operation milestone, an optional parallel operation may be performed indicated by the type of operation milestone. A user may be queried whether to complete the parallel operation. Parallel operations may include, but are not limited to, parallel program product installation or parallel configuration of the one or more program products being installed. The installation of the first program product may continue installation regardless of whether the parallel operation is performed.

Figure 3:
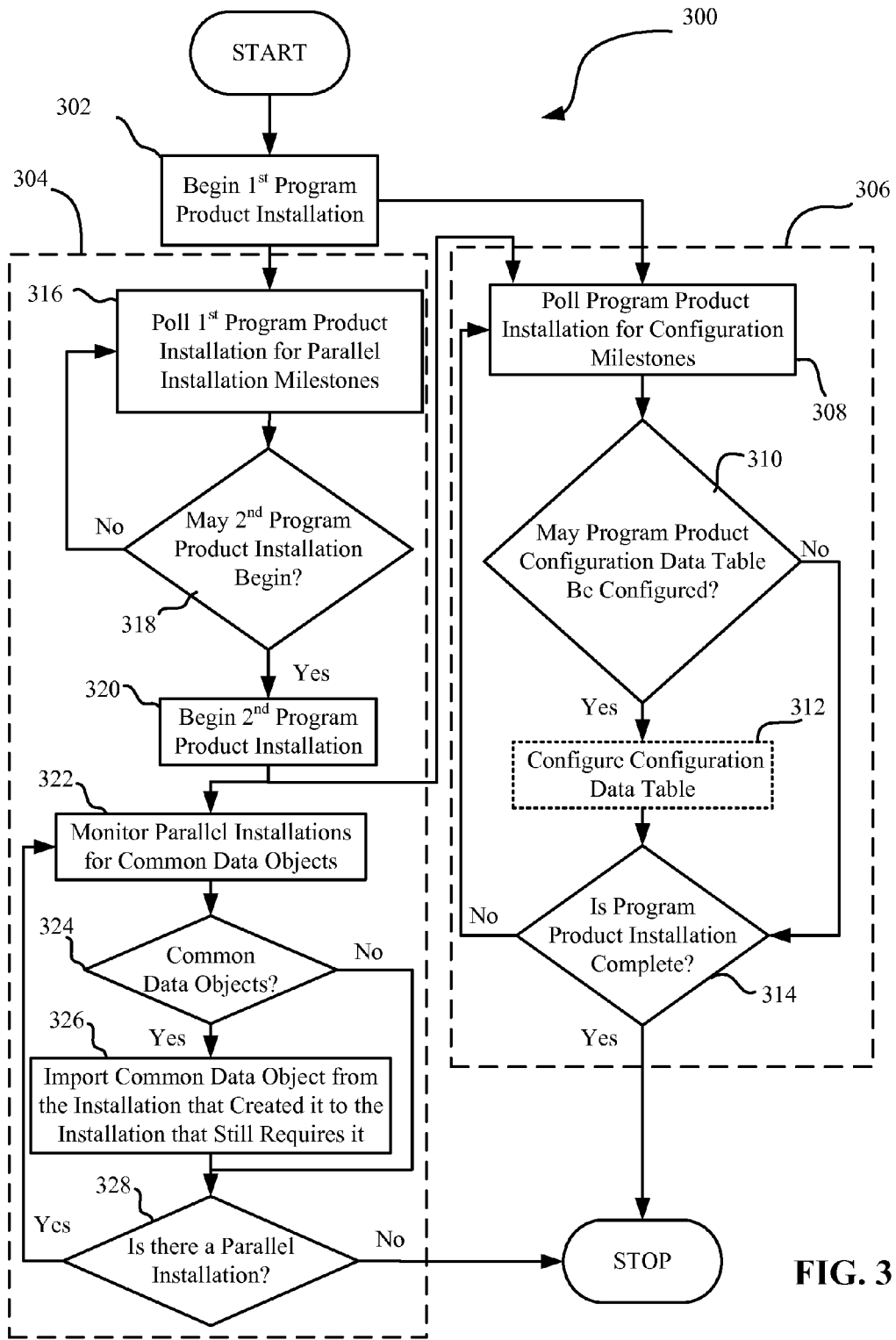
FIG. 3 depicts a more detailed flowchart of the method from FIG. 2 of installing and configuring program products in parallel, according to an embodiment.

Referring to FIG. 3, a more detailed method 300 of parallel program product installations and configurations of method 200 of FIG. 2 is illustrated, according to an embodiment. In operation 302, a first program product may begin installation. As the first program product is being installed on the computer system 100, parallel operations may begin at operation milestones of the first program product installation. Such parallel operations may include the parallel program product installation 304 and the parallel configuration 306.

In operation 308, the parallel configuration 306 of the installing first program product may begin where the installation manager 130 polls the first program product installation for configuration milestones. The polling of the first program product installation may occur at certain time intervals, i.e., every 5 seconds. The installation manager 130 may poll for certain files of the first program product and for data that populates the files. The files being polled may be XML files, for example. While the installation manager 130 polls the first program product installation for configuration milestones, the installation manager 130 may be determining whether a first configuration data table 136 of the first program product may be completed by the user in operation 310. In other embodiments, the configuration data table 136 may be completed autonomously by the installation manager 130 from other stored data. If the first program product installation has not reached a configuration milestone, then in operation 314, the installation manager 130 may determine whether the first program product installation is completed. If the first program product installation is completed, then the method 300 ends. If the first program product installation is not completed, then the installation manager 130 may continue polling the first program product installation.

If the installation manager 130 poll returns that a configuration milestone has been achieved in the first program product installation, then in operation 312 the user may be prompted to configure a first configuration data table of the first program product installation. The user may select to configure the first configuration table immediately or the installation manager 130 may indicate that the configuration milestone has been achieved and the user may choose to work on the configuration at any point of the installation process. After the user has been prompted that the user may work on the first configuration data table, then in operation 314, the installation manager 130 may determine whether the first program product installation is complete or whether the there are anymore configuration milestones. If the installation is not complete or if there are other configuration milestones in the first program product installation, then the installation manager 130 may return to operation 308. If the configuration milestones are complete, then the installation manager 130 may stop polling the first program product installation. Operations 308-314 may be repeated for additional program product installations on the computer system 100.

In one instance, it may be possible to start collecting lightweight directory access protocol (LDAP) information half way through the installations process, i.e. at a configuration milestone. The system may notify the user that it is possible to start working on this activity even though the first program product installation is not completely installed. During the time of the LDAP configuration, the system may flag that the database configuration is now ready for pre-processing, and so on.

Returning to operation 302, after the first product installation begins the parallel operation of parallel program product installation 304 may also begin. In operation 316, a second program product reliant on the installation of the first program product may poll the first program product installation for installation milestones, which may include installed first program product data objects necessary to begin the second program product installation. The polling of the first program product installation may occur at certain time intervals, i.e., every 5 seconds. The second program product may poll for certain data objects of the first program product and for data that populates the first program product data objects. The data objects being polled may be XML files, for example. In operation 318, if the data files needed to begin the second program product installation are not detected by the polling, then the second program product may continue polling the first program product installation in operation 316. In operation 318, if the data objects of the first program product have been installed that are required to begin installing the second program product, then in operation 320, the second program product may begin installing. Operations 308-314 may be performed in relation to the second program product to have parallel configuration 306 of the second program product with the installation of the second program product.

An example of this would be when installing Portal and IBM Connections together. Both of them require Websphere Application Server (WAS) so the installation of WAS must happen first. However once WAS is installed, i.e. an installation milestone, Portal and Connections may be installed into WebSphere at the same time without affecting each other.

Referring back to operation 320, the second program product installation may begin. In operation 322, each of the parallel program product installations may monitor the data objects being installed. The data objects may include configuration data tables 136 or metadata objects 138 described further below. The parallel program product installations may monitor the installed data objects from one program product installation for data objects that may be also used by the other installing program product. These data objects may also be referred to as common data objects. In operation 324, if there are common data objects, then in operation 326, the common data objects may be imported from the program product, which installed the common data object, to the program product installation that still requires it. In operation 328, if there is still a parallel installation, then program product installations may still monitor for common data objects in operation 322. If there is not a parallel installation, then the method 400 may stop. Referring back to operation 324, if there is no common data objects at the current monitoring interval, then operation 328 may be performed.

For example, the second program product installation may create a data object that has not been installed yet on the first program product. The second program product may import the data object to the first program product installation. The importation may change the course, speed up, and lift road blocks or any combination thereof of the first program product installation.

The parallel program product installation 304 may be repeated for any number of program products being installed. For example, a third program product may be installed that may rely on data files to be installed from either the first program product, the second program product, or both the first or second program products before the third program product may be installed. The third program product may poll for the necessary files to begin its installation in whole or in part. Likewise, the parallel configuration 306 may be performed for all or some of the program products that are to be installed on the computer system 100.

The parallel program product installations 304 and the parallel configuration 306 may allow for faster installation time and allow the user to use the installation time to complete configuration options at different milestones during the install to make use of the time needed to install the program product 132.

Figure 4:
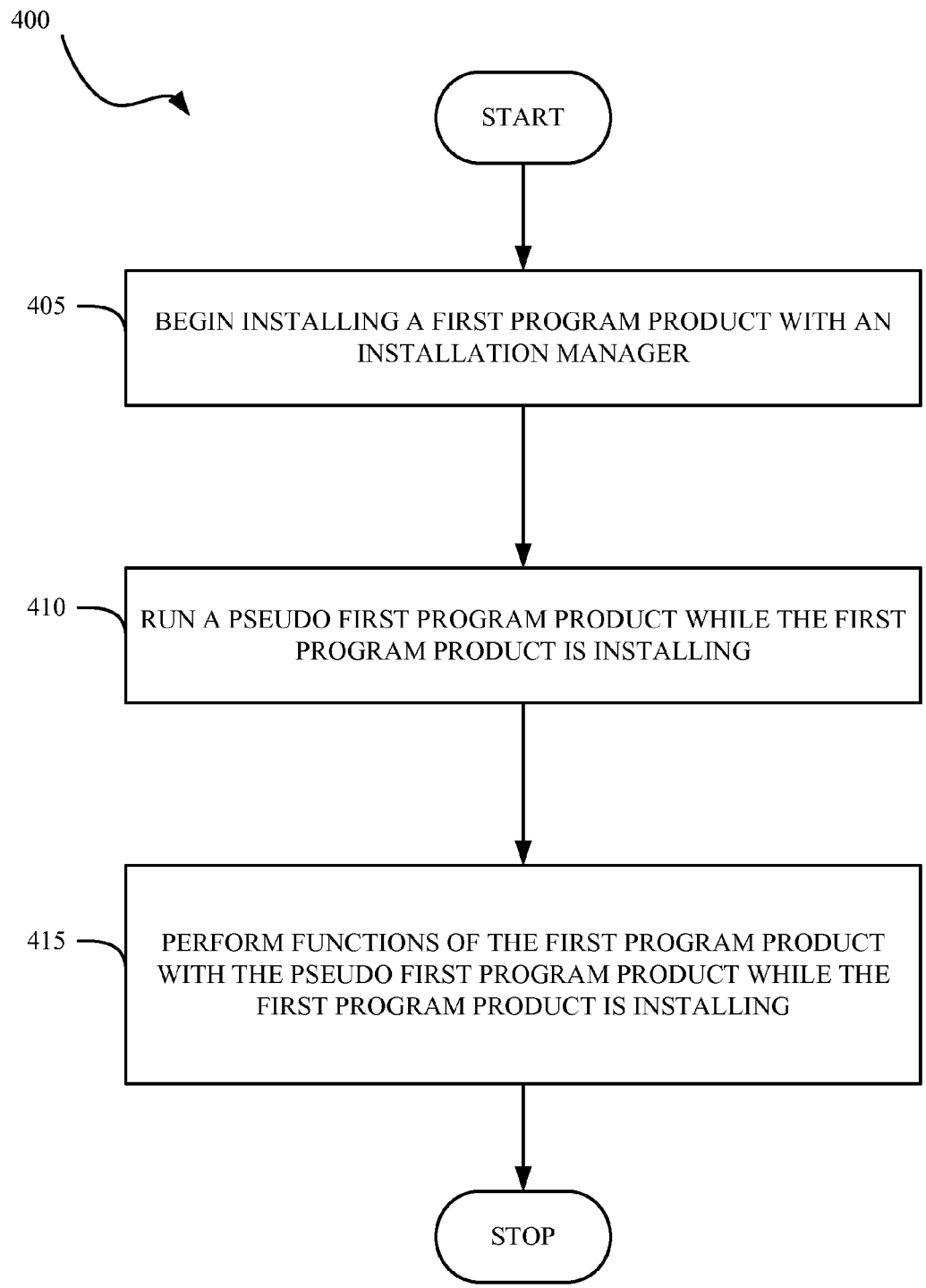
FIG. 4 depicts a flow chart of a high-level method of using a pseudo program product while a program product is installing, according to an embodiment.

Referring to FIG. 4, a flowchart is illustrated of a high-level method 400 of performing program product operations while the first program product is installing, according to an embodiment. In operation 405, the method 400 may start upon beginning the installation of the first program product on the computer system 100. The installation of the first program product may be managed by the installation manager 130. In operation 410, as the first program product is being installed a pseudo first program product may be activated for use while the first program product is installing. The pseudo first program product may be a full or light version of the first program product. The pseudo first program product may be a web based program. The pseudo first program product is described further below. In operation 415, functions of the first program product may be performed with the pseudo first program product while the first program product is installing.

Figure 5:
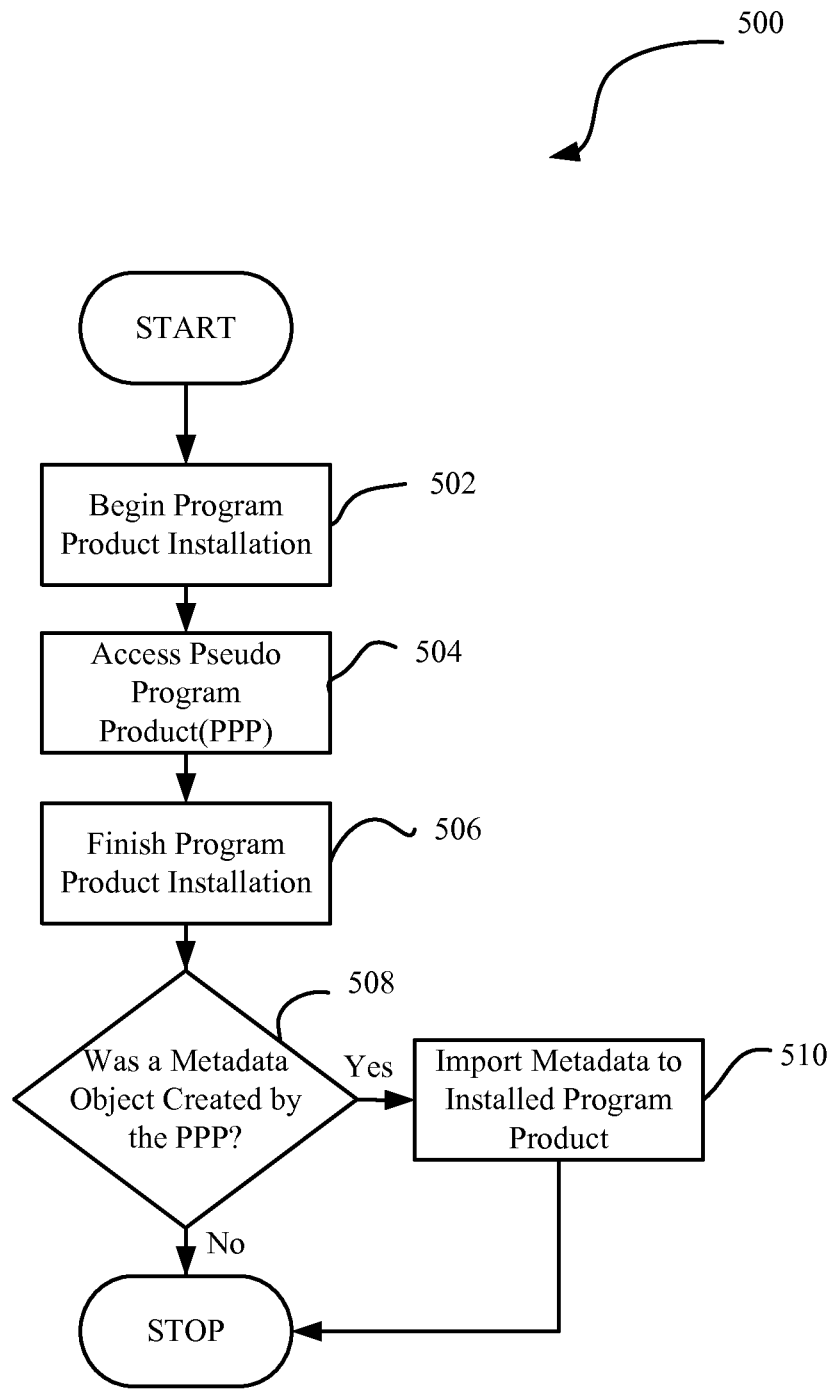
FIG. 5 depicts a more detailed flowchart of the method from FIG. 4 of using a pseudo program product while the actual program product is being installed, according to an embodiment.

Referring to FIG. 5, a more detailed method 500 is illustrated of performing program product operations while the first program product is installing of method 400 of FIG. 4, according to an embodiment. FIG. 5 illustrates the use of a pseudo program in parallel with the installation of a program product. In operation 502, the program product 132 may begin installation. In operation 504, the installation manager 130 may prompt the user with an option to use a pseudo program product. The option to access the pseudo program product 134 may occur upon the start of installation of the program product 132. A license from the program product may allow the user to access the pseudo program product 134. In one embodiment, the pseudo program product may be a light version of the installing program product. In one embodiment, the pseudo program product may be a web based technology such as, but not limited to, Flash, HTML, and JavaScript. A web screen may be shown to the user that mimics the program product 132 that is being installed. In another embodiment, the pseudo program product may be part of the program product being installed. After the program product installs certain files, then the pseudo program product may run for the remainder of the program product installation.

The pseudo program product may have a limited function and may provide features that the user may click to get information about the program product, run tutorials of the program product, or even create simple data objects (metadata objects 138) using functions of the pseudo program product 134 that are included in the program product 132. In addition, the pseudo program product 134 may also do simple runtime operations (such as creating a Portal page in WebSphere Portal or a mock admin console for WebSphere). The metadata objects 138 may be saved in an XML format, for example, and imported to be used by the program product 132 once the program product 132 has installed completely. A metadata object 138 may correspond to a data object in the program product 132, e.g., user's name In operation 506, the first program product 132 installation may finish. In operation 508, the program product 134 may determine whether a pseudo program product metadata object 138 was created by the pseudo program product 134 during installation. If no metadata objects 138 were created from the pseudo program product 134 during the program product 132 installation, then the method 500 may stop. In some instances, the user may not access the pseudo program product 134 or only perform functions in the pseudo program product 134 that do not result in the creation of a metadata object 138. If one or more metadata objects 138 were created during the installation or after the installation, then in operation 510, the metadata objects 138 may be imported into the program product 132. The metadata object 138 may be imported into the program product 132 before, during, or after the program product 132 installation. Also, the pseudo program product 134 may have the capability to allow the user to use the pseudo program product after the installation of the program product 132 has occurred.

In another embodiment, the XML metadata object 138 created by the pseudo program product 134 may be used as metadata for a starting point of further installations. For example, a simple load icon may allow the user to import a metadata object 138 into the installation manager, which could be read and used to render the starting point of the pseudo program product display of sequential installations.

In another embodiment, a combination or all of pseudo program products, parallel program product installations, and parallel configurations may be incorporated in the installation manager 130 for some or all of the program products being installed.

In yet another embodiment, the installation manager 130 may determine and display the time remaining until the next operation milestone to the user.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments, reference was made to the accompanying drawings, which form a part hereof, and in which is shown by way of illustration specific exemplary embodiments in which the embodiments may be practiced. These embodiments were described in sufficient detail to enable those skilled in the art to practice the embodiments, but other embodiments may be utilized and logical, mechanical, electrical, and other changes may be made without departing from the scope of the embodiments. In the previous description, numerous specific details were set forth to provide a thorough understanding of embodiments. But, embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A method of performing program product operations during the installation of a program product comprising:
    installing a first program product with an installation manager, wherein the first program product is a full version of a web application server program product;
    running a pseudo first program product while the first program product is installing, wherein the pseudo first program product is a light version of the first program product, wherein the pseudo first program product is not a component of the first program product;
    polling, at every first particular time interval and during the installing, the first program product for one or more configuration milestones, the polling including polling for one or more units of data of a particular file of the first program product;
    determining, during the polling at every first time interval and during the installing, whether a configuration data table of the first program product may be completed by a user;
    polling, at every second particular time interval and during the installing and during the polling at every first time interval, the first program product for an installation milestone, the polling at every second particular time interval including determining whether the first program product has installed one or more data objects necessary to begin installing a second program product;
    performing a first function of the first program product with the pseudo first program product while the first program product is installing, the first function including rendering a mock web application server administrator console;
    performing a second function of the first program product with the pseudo first program product while the first program product is installing, the second function including creating a data object that has not been installed yet on the first program product;
    importing, during the installing of the first program product and in response to the performing of the second function, the data object from the pseudo first program product to the first program product; and
    performing a parallel operation concurrent with the installation of the first program product, wherein the parallel operation is in response to the installation milestone of the first program product being reached, the performing of the parallel operation including installing the second program product in parallel with the installing of first program product upon reaching the installation milestone of the first program product, the installation milestone corresponding with a point after the installation of the first program product has already begun at which installation of the second program product can begin, wherein the first program product has installed the one or more data objects necessary to begin installing the second program product.

2. The method of claim 1, wherein the performing a second function includes:
    creating a XML metadata object by the pseudo first program product; and
    importing the XML metadata object for use by the first program product when the first program product has completed installation.

3. The method of claim 2, further comprising importing the XML metadata object for use by the second program product installation.

4. The method of claim 1, further comprising:
    monitoring the parallel installations of the first program product and the second program product for a common data object; and
    importing the common data object from the program product that created the common data object to the program product that still requires the common data object.

5. The method of claim 1, further comprising:
    notifying, at the detection of the second milestone, a user to begin working on a Lightweight Directory Access Protocol (LDAP) activity;
    collecting, subsequent to the notifying, information about the LDAP activity, wherein the collecting the information is the collecting of the data to configure the first program product;
    and flagging that the configuring of the first program product is ready for preprocessing.

6. The method of claim 1, wherein the web application server program product is a Websphere program product and wherein the first pseudo program product is a JavaScript pseudo program product.

7. A non-transitory computer-readable storage medium encoded with instructions, wherein the instructions when executed comprise:
    installing a first program product with an installation manager, wherein the first program product is a full version of a program product, and wherein the first program product is a full version of a web application server program product;
    running a pseudo first program product while the first program product is installing, wherein the pseudo first program product is a light version of the first program product, wherein the pseudo first program product is not a component of the first program product, and wherein the pseudo first program product includes a plurality of user interface features, the plurality of user interface features including: a first feature to receive information about the first program product and a second feature to create one or more metadata objects; and polling, at every first particular time interval and during the installing, the first program product for one or more configuration milestones, the polling including polling for one or more units of data of a particular file of the first program product;

determining, during the polling at every first time interval and during the installing, whether a configuration data table of the first program product may be completed by a user;

polling, at every second particular time interval and during the installing and during the polling at every first time interval, the first program product for an installation milestone, the polling at every second particular time interval including determining whether the first program product has installed one or more data objects necessary to begin installing a second program product;

performing a first function of the first program product with the pseudo first program product while the first program product is installing, the first function including rendering a mock web application server administrator console;

performing a second function of the first program product with the pseudo first program product while the first program product is installing, the second function including creating a data object that has not been installed yet on the first program product;

importing, during the installing of the first program product and in response to the performing of the second function, the data object from the pseudo first program product to the first program product; and performing a parallel operation concurrent with the installation of the first program product, wherein the parallel operation is in response to the installation milestone of the first program product being reached, the performing of the parallel operation including installing the second program product in parallel with the installing of first program product upon reaching the installation milestone of the first program product, the installation milestone corresponding with a point after the installation of the first program product has already begun at which installation of the second program product can begin, wherein the first program product has installed the one or more data objects necessary to begin installing the second program product.

8. The non-transitory computer-readable storage medium of claim 7, wherein the performing a function includes:
receiving a user request to create a XML metadata object based on selecting the second feature;
importing, during the installing, the XML metadata object for use by the first program product installation; and
accelerating, in response to the importing, the installing of the first program product.

9. The non-transitory computer-readable storage medium of claim 8, further comprising importing the XML metadata object for use by a second program product installation.

10. The non-transitory computer-readable storage medium of claim 7, further comprising:
monitoring the parallel installations of the first program product and the second program product for a common data object; and
importing the common data object from the program product that created the common data object to the program product that still requires the common data object.

11. The non-transitory computer-readable storage medium of claim 7, wherein the plurality of user interface features includes: a third feature to run one or more tutorials of the first program product, and a fourth feature that displays a time remaining until a next operation milestone has been reached.

12. A computer comprising:
a processor; and
memory communicatively coupled to the processor, wherein the memory is encoded with instructions, and wherein the instructions when executed by the processor include installing a first program product with an installation manager, wherein the first program product is a full version of a WebSphere application server program product;

running a pseudo first program product while the first program product is installing, wherein the pseudo first program product is a light version of the first program product, wherein the pseudo first program product is not a component of the first program product; and polling, at every first particular time interval and during the installing, the first program product for one or more configuration milestones, the polling including polling for one or more units of data of a particular file of the first program product;

determining, during the polling at every first time interval and during the installing, whether a configuration data table of the first program product may be completed by a user;

polling, at every second particular time interval and during the installing and during the polling at every first time interval, the first program product for an installation milestone, the polling at every second particular time interval including determining whether the first program product has installed one or more data objects necessary to begin installing a second program product;

performing a first function of the first program product with the pseudo first program product while the first program product is installing, wherein the performing the first function includes creating a WebSphere portal page;

performing a second function of the first program product with the pseudo first program product while the first program product is installing, the second function including creating a data object that has not been installed yet on the first program product;

importing, during the installing of the first program product and in response to the performing of the second function, the data object from the pseudo first program product to the first program product; and performing a parallel operation concurrent with the installation of the first program product, wherein the parallel operation is in response to the installation milestone of the first program product being reached, the performing of the parallel operation including installing the second program product in parallel with the installing of first program product upon reaching the installation milestone of the first program product, the installation milestone corresponding with a point after the installation of the first program product has already begun at which installation of the second program product can begin, wherein the first program product has installed the one or more data objects necessary to begin installing the second program product.

13. The computer of claim 12, wherein the performing a function includes:
   creating a metadata object by the pseudo first program product; and
   importing the metadata object for use by the first program product when the first program product has completed installation.

14. The computer of claim 13, further comprising importing the metadata object for use by a second program product installation.

* * * * *